US012528711B2

(12) United States Patent
Kususe et al.

(10) Patent No.: US 12,528,711 B2
(45) Date of Patent: Jan. 20, 2026

(54) POWDER OF GALLIUM NITRIDE AND METHOD FOR PRODUCING THE SAME

(71) Applicant: TOSOH CORPORATION, Yamaguchi (JP)

(72) Inventors: Yoshiro Kususe, Kanagawa (JP); Shinichi Hara, Kanagawa (JP); Junya Iihama, Kanagawa (JP); Masami Mesuda, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 58 days.

(21) Appl. No.: 18/732,633

(22) Filed: Jun. 4, 2024

(65) Prior Publication Data
US 2024/0409429 A1    Dec. 12, 2024

(30) Foreign Application Priority Data

Jun. 9, 2023  (JP) .................................. 2023-095501

(51) Int. Cl.
C01G 15/00    (2006.01)
(52) U.S. Cl.
CPC .......... *C01G 15/00* (2013.01); *C01P 2004/61* (2013.01); *C01P 2006/11* (2013.01)

(58) Field of Classification Search
None
See application file for complete search history.

(56) References Cited

U.S. PATENT DOCUMENTS

2018/0072570 A1    3/2018  Mesuda et al.
2021/0380488 A1*   12/2021 Mesuda ............ C04B 35/62645

OTHER PUBLICATIONS

C.M. Balkas et al., "Growth and characterization of GaN single crystals", Journal of Crystal Growth 208 (2000), pp. 100-106, 7pp.
X.M. Cai, et al., "GaN nanowires: CVD synthesis and properties", Thin Solid Films, Nov. 23, 2006, 984-989 pages, vol. 515, 6pp.
Bright Schwenzer et al., Gallium Nitride Powders from Ammonolysis : Influence of Reaction Parameters on Structure and Properties, Chemistry of Materials, vol. 16, No. 24, Oct. 21, 2004, pp. 5088-5095, XP093222607, US, 8pp.
Extended European Search Report in EP Application No. 24180882.3, dated Dec. 4, 2024, 10pp.

* cited by examiner

*Primary Examiner* — Kim S. Horger
(74) *Attorney, Agent, or Firm* — HAUPTMAN HAM, LLP

(57) ABSTRACT

A powder of gallium nitride has an oxygen content of 0.5 at or less. A green body formed by charging 8 g of the powder into a rectangular cuboidal die having a size of 10 mm×40 mm and uniaxially pressing the powder at a pressure of 100 MPa has an electrical resistivity of $1.0 \times 10^7 \Omega \cdot cm$ or less.

10 Claims, No Drawings

POWDER OF GALLIUM NITRIDE AND METHOD FOR PRODUCING THE SAME

RELATED APPLICATIONS

The present application claims priority to Japanese Patent Application No. 2023-095501, filed Jun. 9, 2023, the disclosures of which is hereby incorporated by reference herein in its entirety.

BACKGROUND OF THE INVENTION

1. Field of the Invention

The present disclosure relates to a powder of gallium nitride and specifically to a powder of gallium nitride which may be suitably used as a precursor of a sputtering target.

2. Description of the Related Art

Sintered bodies of gallium nitride (GaN) have been produced by pressure sintering, such as hot pressing, in which a powder of gallium nitride is sintered while being formed into shape. Since pressure sintering requires large-scale equipment and limits the shape of a sintered body of gallium nitride which can be formed, there has been a demand for a method for producing a sintered body of gallium nitride without using pressure sintering. However, since gallium nitride has low formability, it is difficult to form gallium nitride into shape (i.e., into a green compact) prior to sintering. Accordingly, a powder of gallium nitride which can be formed into a green body prior to sintering has been studied. For example, Journal of Crystal Growth, 208 (2000), 100-106, reports that controlling the particle size of the powder using jet mill pulverization enables the formation of a green body of gallium nitride.

SUMMARY OF THE INVENTION

Although the powder of gallium nitride which is disclosed in Journal of Crystal Growth, 208 (2000), 100-106, can be formed into a green body, the relative density of the green body is 60%, that is, low. Moreover, since the green body is likely to cleave, it is difficult to maintain the shape of the green body in a consistent manner.

Accordingly, it is an object of the present disclosure to provide at least one of a powder of gallium nitride which can be formed into a green body having a high forming density compared with any of the powders of gallium nitride which are known in the related art, a method for producing the powder of gallium nitride and a method for producing a sintered body in which the powder of gallium nitride is used.

In the present disclosure, a technique in which a green body of gallium nitride is prepared prior to sintering was studied in order to produce a sintered body of gallium nitride which can be suitably used as a sputtering target without using pressure sintering. As a result, with attention being focused on the electrical property of the powder, it was found that a green body having a high forming density may be produced by controlling the electrical property of the powder to fall within a specific range.

Specifically, the present invention is as described in the claims below. The summary of the present disclosure is as follows.

[1] A powder of gallium nitride, the powder having an oxygen content of 0.5 at % or less, wherein a green body formed by charging 8 g of the powder into a rectangular cuboidal die having a size of 10 mm×40 mm and uniaxially pressing the powder at a pressure of 100 MPa has an electrical resistivity of $1.0 \times 10^7 \Omega \cdot cm$ or less.

[2] The powder according to [1], wherein the gallium nitride has a nitrogen vacancy.

[3] The powder according to [1] or [2], having an untamped bulk density of 1.00 g/mL or more and 1.85 g/mL or less.

[4] The powder according to any one of [1] to [3], having an average particle size of 1 µm or more and 150 µm or less.

[5] The powder according to any one of [1] to [4], wherein a ratio of an area-10% size of the powder to an area-90% size of the powder is 0.01 or more and 0.45 or less.

[6] A method for producing the powder according to any one of [1] to [5], the method comprising a heat treatment step that is a step of heating a powder of gallium nitride at 900° C. or more and 1,300° C. or less in an atmosphere in which an inert gas flows.

[7] The method according to [6], wherein the powder of gallium nitride is a powder of gallium nitride prepared by nitriding metal gallium.

[8] The method according to [6] or [7], wherein the inert gas-flow atmosphere is an atmosphere in which a gas including at least one of argon and nitrogen flows.

[9] The method according to any one of [6] to [8], wherein a rate at which the inert gas flows is 500 mL/min or more and 5,000 mL/min or less.

A method for producing a sintered body of gallium nitride, the method comprising forming the powder according to any one of [1] to [5] in to a green body, and sintering the green body.

According to the present disclosure, at least one of a powder of gallium nitride which can be formed into a green body having a high forming density compared with any of the powders of gallium nitride which are known in the related art, a method for producing the powder of gallium nitride and a method for producing a sintered body in which the powder of gallium nitride is used may be provided.

DESCRIPTION OF THE PREFERRED EMBODIMENTS

A powder according to the present disclosure is described below with reference to an exemplary embodiment. In the present disclosure, "at %" is synonymous with "atm %", which is a measure of proportion in terms of number of atoms. The present disclosure includes various combinations of the structures and parameters disclosed in the present specification. The present disclosure also includes ranges expressed by various combinations of the upper and lower limits disclosed in the present specification.

The powder according to this embodiment is a powder of gallium nitride which has an oxygen content of 0.5 at % or less. Furthermore, a green body formed by charging 8 g of the powder into a rectangular cuboidal die having a size of 10 mm×40 mm and uniaxially pressing the powder at a pressure of 100 MPa has an electrical resistivity of $1.0 \times 10^7 \Omega \cdot cm$ or less.

The powder according to this embodiment may be any powder that includes gallium nitride (GaN) as a principal component (i.e., matrix), that is, may be any powder consisting substantially of gallium nitride. The powder may include inevitable impurities.

The oxygen content in the powder according to this embodiment is 0.5 at % or less and is preferably 0.4 at % or less or 0.3 at % or less. If the above oxygen content is more than 0.5 at %, a gallium oxide layer may be formed, which increases electrical resistivity. The oxygen content is preferably minimized and is, for example, 0.02 at % or more or 0.05 at % or more. The oxygen content is preferably, for example, 0.02 at % or more and 0.5 at % or less or 0.05 at % or more and 0.3 at % or less.

In this embodiment, the above oxygen content is the atomic proportion [at %] of oxygen included in the gallium nitride powder to the powder, which can be calculated from a values [mass %] measured by an inert gas fusion-infrared absorption method with an oxygen-nitrogen analyzer (e.g., "LECO ON736" produced by LECO Japan Corporation) using Formula (1) below.

$$\text{Oxygen content [at \%]} = (W_O/M_O)/\{(W_{Ga}/M_{Ga}) + (W_N/M_N) + (W_O/M_O)\} \quad (1)$$

In Formula (1), $M_O$ represents the atomic weight of oxygen (16.00 [g/mol]), $M_{Ga}$ represents the atomic weight of gallium (69.72 [g/mol]) and MN represents the atomic weight of nitrogen (14.01 [g/mol]). $W_O$ and $W_N$ represent the values [mass %] measured by an inert gas fusion-infrared absorption method with an oxygen-nitrogen analyzer (e.g., "LECO ON736" produced by LECO Japan Corporation). $W_{Ga}$ represents a value calculated from the measured values represented by $W_O$ and $W_N$ using Formula (2) below.

$$100 = W_{Ga} \text{ [mass \%]} + W_O \text{ [mass \%]} + W_N \text{ [mass \%]} \quad (2)$$

The electrical resistivity of a green body formed by charging 8 g of the powder according to this embodiment into a rectangular cuboidal die having a size of 10 mm×40 mm and uniaxially pressing the powder at a pressure of 100 MPa (hereinafter, the above electrical resistivity is also referred to simply as "electrical resistivity") is $1.0 \times 10^7 \Omega \cdot cm$ or less. Since the powder according to this embodiment has the above-described electrical resistivity and the above-described oxygen content, the powder may have high formability and can be formed into a green body without sintering. One of the reasons for which the powder according to this embodiment has excellent formability may be as follows. Specifically, since the powder according to this embodiment has the above-described oxygen content and the above-described electrical resistivity, particles of the powder repel one another in an adequate manner, which reduces the likelihood of the particles aggregating with one another locally. In addition, particles of the powder readily come into intimate contact with one another when an external force is applied to the powder. This may markedly enhance formability.

The lower the electrical resistivity of the powder, the higher the formability of the powder. Thus, the electrical resistivity of the powder is preferably $1 \times 10^5 \Omega \cdot cm$ or less, 1 $\Omega \cdot cm$ or less or $1 \times 10^{-1}$ $\Omega \cdot cm$ or less. The electrical resistivity of the powder is preferably minimized and is, for example, $1 \times 10^{-4}$ $\Omega \cdot cm$ or more or $1 \times 10^{-3}$ $\Omega \cdot cm$ or more. The electrical resistivity of the powder is preferably, for example, $1 \times 10^{-4}$ $\Omega \cdot cm$ or more and $1 \times 10^7 \Omega \cdot cm$ or less, $1 \times 10^{-3}$ $\Omega \cdot cm$ or more and $1 \times 10^5 \Omega \cdot cm$ or less or $1 \times 10^{-4}$ $\Omega \cdot cm$ or more and $1 \times 10^{-1}$ $\Omega \cdot cm$ or less.

In this embodiment, the electrical resistivity of the powder is measured by the following method. Specifically, 8 g of the powder is charged into a rectangular cuboidal die having a size of 10 mm×40 mm and then uniaxially pressed at a pressure of 100 MPa to form a green body for evaluation. The electrical resistivity of the green body for evaluation may be measured using a common resistance meter (e.g., "Loresta GX MCP-T700" produced by Nittoseiko Analytech Co., Ltd.) and a TFP probe as a measurement probe.

In order to increase the likelihood of the power having the above electrical resistivity, gallium nitride included in the powder according to this embodiment is preferably a powder of gallium nitride having nitrogen vacancies, that is, "nitrogen vacancy-type gallium nitride".

It is preferable that the powder according to this embodiment have, in addition to high formability, a high filling property during handling, such as transportation. In order to increase the likelihood of the powder having such a filling property, the untamped bulk density of the powder according to this embodiment may be 1.00 g/mL or more, 1.30 g/mL or more or 1.50 g/mL or more. The above untamped bulk density is preferably maximized. The untamped bulk density is, for example, 1.85 g/mL or less, 1.80 g/mL or less or 1.70 g/mL or less and is preferably 1.00 g/mL or more and 1.85 g/mL or less, 1.30 g/mL or more and 1.85 g/mL or less or 1.50 g/mL or more and 1.70 g/mL or less.

The above untamped bulk density may be determined using a method conforming to JIS Z 2504. Specifically, in this embodiment, the untamped bulk density may be determined by the following method. A funnel having an orifice diameter of 2.5 mm and a funnel angle of 60° is used. The powder is charged into a cylindrical container having an inside diameter of 28 mm and a volumetric capacity of 25 cm³, and charging of the powder is stopped when the cylindrical container is filled with the powder. Subsequent to the charging, the powder is leveled off at the surface of the cylindrical container without application of compression or vibration. The ratio of the mass [g] of the leveled powder to the volume [25 cm³] of the cylindrical container is calculated as an untamped bulk density.

The average particle size of the powder according to this embodiment is 1 µm or more or 2 µm or more and may be, for example, 150 µm or less, 50 µm or less, 20 µm or less, 15 µm or less or 10 µm or less. The above average particle size is preferably 1 µm or more and 150 µm or less, 2 µm or more and 50 µm or less, 2 µm or more and 20 µm or less or 2 µm or more and 10 µm or less. When the powder has the above average particle size, the oxygen content in the powder is not increased to an excessive degree and the powder is likely to have high formability.

In this embodiment, the above average particle size is a value calculated from the areas of primary particles observed in an SEM observation image obtained under the following conditions with a common scanning electron microscope (e.g., "VE-9800" produced by KEYENCE Corporation; hereinafter, also referred to as "SEM").

Acceleration voltage: 10 kV

Magnification: 50 to 5,000 times

The SEM observation image is subjected to binary conversion and image analysis using common image analysis software (e.g., "Image-Pro10"), and 1,200±400 primary particles the entire outlines of which can be observed in the SEM observation image are selected. The maximum size of each of the primary particles is measured and considered as the size of the primary particle. The average size of the primary particles is considered as an average particle size.

The primary particles of the powder according to this embodiment preferably have an adequate particle size distribution in order to increase the likelihood of the powder having high formability. For example, the ratio of the area-10% size (D10) [μm] to the area-90% size (D90) [μm] is preferably 0.01 or more and 0.45 or less and is further preferably 0.04 or more and 0.20 or less.

In this embodiment, D10 and D90 may be determined by calculating the equivalent circle area of each of the primary particles which is the area of an equivalent circle having a size equal to the maximum size (i.e., particle size) of the primary particle, which can be measured as in the measurement of the average particle size, and considering the maximum sizes that correspond to the equivalent circle areas corresponding to cumulative areas 10% and 90% as D10 and D90, respectively.

The powder according to this embodiment can be formed into shape without using a forming method in which pressure sintering or the like is used.

The powder according to this embodiment has high formability. For example, the actual density of a green body formed by charging 8 g of the powder into a rectangular cuboidal die having a size of 10 mm×40 mm and uniaxially pressing the powder at a pressure of 100 MPa (hereinafter, this density is also referred to as "forming density") is 2.0 g/cm$^3$ or more, 3.0 g/cm$^3$ or more, 3.5 g/cm$^3$ or more, 3.8 g/cm$^3$ or more or 4.0 g/cm$^3$ or more. Although the above forming density is preferably maximized, the forming density may be, for example, 5.0 g/cm$^3$ or less, 4.5 g/cm$^3$ or less, 4.2 g/cm$^3$ or less or 4.1 g/cm$^3$ or less. The forming density may be, for example, 2.0 g/cm$^3$ or more and 5.0 g/cm$^3$ or less, 3.0 g/cm$^3$ or more and 4.5 g/cm$^3$ or less, 3.5 g/cm$^3$ or more and 4.5 g/cm$^3$ or less, 3.8 g/cm$^3$ or more and 4.5 g/cm$^3$ or less, 3.5 g/cm$^3$ or more and 4.2 g/cm$^3$ or less or 4.0 g/cm$^3$ or more and 4.1 g/cm$^3$ or less.

The deflective strength of a green body formed by charging 8 g of the powder according to this embodiment into a rectangular cuboidal die having a size of 10 mm×40 mm and uniaxially pressing the powder at a pressure of 100 MPa (hereinafter, this strength is also referred to as "the deflective strength of the green body") is, for example, 2.1 MPa or more, 2.3 MPa or more or 2.5 MPa or more. Although the deflective strength of the green body is preferably maximized, for example, the deflective strength is 10 MPa or less, 8 MPa or less, 7.0 MPa or less, 5.0 MPa or less, 4.5 MPa or less or 4.0 MPa or less. The deflective strength is, for example, 2.1 MPa or more and 10 MPa or less, is 2.3 MPa or more and 7 MPa or less, is 2.5 MPa or more and 5.0 MPa or less or is 2.5 MPa or more and 4.0 MPa or less.

The powder according to this embodiment may be used for the applications known in the related art in which a powder of gallium nitride is used. The powder according to this embodiment is preferably used particularly as a precursor of a sintered body, a precursor of a sintered body for sputtering targets and a precursor of a polycrystalline gallium nitride substrate.

A method for producing the powder according to this embodiment is described below.

The method for producing the powder according to this embodiment is not limited and may be any production method with which the above-described powder of gallium nitride can be produced. A preferable example of the production method is a powder production method that includes a heat treatment step that is a step of heating a powder of gallium nitride at 900° C. or more and 1,300° C. or less in an atmosphere in which an inert gas flows (hereinafter, this atmosphere is also referred to as "inert gas-flow atmosphere").

The powder of gallium nitride which is subjected to the above heat treatment step (hereinafter, such a powder is also referred to as "raw-material powder") is preferably a powder of gallium nitride which is prepared by nitriding metal gallium.

The metal gallium subjected to the above nitridation treatment is not limited and may be a commercial metal gallium material. Examples thereof include a metal gallium material having a purity of 3N or more and 7N or less.

The nitridation treatment may be performed under any conditions under which nitridation of metal gallium occurs. Examples of such conditions include the following.

Nitridation Atmosphere:
    nitrogen-containing gas-flow atmosphere
    preferably, nitrogen-flow atmosphere or ammonia-flow atmosphere
    more preferably, ammonia-flow atmosphere Nitridation Temperature:
    900° C. or more and 1,100° C. or less
    preferably, 950° C. or more and 1,050° C. or less Heating Rate:
    5° C./min or more and 50° C./min or less
    preferably, 8° C./min or more and 20° C./min or less The amount of time during which the nitridation treatment is performed may be adjusted appropriately in accordance with the metal gallium material that is to be subjected to the nitridation treatment and the method used for performing the nitridation treatment. The amount of nitridation treatment time is, for example, 30 minutes or more and 15 hours or less or 1 hour or more and 10 hours or less.

In the heat treatment step, the raw-material powder is heated at 900° C. or more and 1,300° C. or less in an inert gas-flow atmosphere. This causes pyrolysis of gallium nitride to occur in an adequate manner, and nitrogen deficit-type gallium nitride is formed as a result of elimination of part of nitrogen atoms, which may result in formation of conductive carriers. This makes it possible to produce the powder according to this embodiment which has a certain electrical resistivity with which the formability of the powder can be enhanced.

In the heat treatment step, the atmosphere in which the above heat treatment is performed is an inert gas-flow atmosphere. This eliminates the possibility of the oxygen content in the powder being increased to an excessive degree. The inert gas-flow atmosphere is not limited and may be any atmosphere in which oxidation of the raw-material powder does not occur. The inert gas-flow atmosphere is preferably an atmosphere in which a gas including at least one of argon and nitrogen flows and is more preferably a nitrogen gas-flow atmosphere.

The rate at which the inert gas flows is not limited and may be any rate at which scattering of the raw-material powder that is to be treated can be reduced and the gas component generated by the heat treatment can be purged. The above rate is, for example, 500 mL/min or more and 5,000 mL/min or less, is 800 mL/min or more and 4,000 mL/min or less or is 1,000 mL/min or more and 2,500 mL/min or less.

The above heat treatment is performed at 900° C. or more and 1,300° C. or less in the inert gas-flow atmosphere. If the above heat treatment temperature is less than 900° C., it takes a considerably large amount of time for the pyrolysis of gallium nitride and it becomes difficult to perform the heat treatment within a practical period of time. On the other hand, if the heat treatment temperature is more than 1,300° C., the pyrolysis of gallium nitride occurs to an excessive degree and the powder particles may collapse. The heat treatment temperature is preferably 950° C. or more or 1,000° C. or more and may be, for example, 1, 200° C. or less or 1,100° C. or less. The heat treatment temperature is 950° C. or more and 1,200° C. or less or is 1,000° C. or more and 1,100° C. or less.

The amount of heat treatment time may be adjusted appropriately in accordance with, for example, the properties of the furnace used for the heat treatment. The amount of heat treatment time is, for example, 15 minutes or more and 15 hours or less, is 30 minutes or more and 10 hours or less or 1 hour or more and 3 hours or less.

The above heat treatment may be performed using any heat treatment furnace with which a heat treatment can be performed in an inert gas-flow atmosphere. One or more furnaces selected from a tube furnace, an atmosphere box electric furnace and an atmosphere muffle furnace may be used. Specifically, for example, a tube furnace may be used.

A method for producing a sintered body formed of the powder according to this embodiment is described below.

The powder according to this embodiment can be formed into a sintered body by a method similar to the methods for producing sintered bodies of gallium nitride which are known in the related art. The powder according to this embodiment may be used as a precursor of a sintered body of gallium nitride. Examples of the production methods known in the related art include a method for producing a sintered body of gallium nitride which includes a step of pressure-sintering the powder according to this embodiment. The pressure sintering may be at least one of hot pressing and hot isostatic pressing and is preferably a hot pressing treatment. This enables forming and sintering of the powder to be performed simultaneously.

In addition, since the powder according to this embodiment has high formability and can be formed into shape without heating, the powder according to this embodiment is preferably subjected to a method for producing a sintered body of gallium nitride, the method including forming the powder according to this embodiment into a green body and sintering the green body.

The forming method used in the above forming step may be any forming method with which a green body (i.e., green compact) having an intended shape can be formed and may be one or more forming methods selected from the group consisting of uniaxial pressing, cold isostatic pressing, slurry slip casting and injection molding. Uniaxial pressing is preferably used. A forming method in which uniaxial pressing is performed at a forming pressure of 50 MPa or more and 150 MPa or less is more preferably used.

The sintering method used in the sintering step may be at least one of normal-pressure sintering and pressure sintering and is preferably normal-pressure sintering. Note that, in this embodiment, the term "normal-pressure sintering" refers to a method in which the object that is to be sintered, such as a green body, is heated at a temperature equal to or more than the temperature at which sintering of the object occurs without any external forces being applied to the object.

A sintered body produced by the production method according to this embodiment may be used for various applications known in the related art in which gallium nitride is used. The above sintered body may be used as one or more selected from the group consisting of a sputtering target, a polycrystalline gallium nitride substrate and a raw material for growth of single-crystal gallium nitrides and is particularly suitable as a sputtering target.

EXAMPLES

The present disclosure is described with reference to Examples below. It should be noted that the present disclosure is not limited by Examples.

Electrical Resistivity

The electrical resistivity of the powder was measured using "Loresta GX MCP-T700" produced by Nittoseiko Analytech Co., Ltd. Specifically, 8 g of a powder sample was charged into a rectangular cuboidal die having a size of 10 mm×40 mm and then uniaxially pressed at a pressure of 100 MPa to form a green body for evaluation. The electrical resistivity of the green body for evaluation was measured using a TFP probe as a measurement probe.

Deflective Strength

The deflective strength of the green body was measured in conformity with JIS R 1601 under the following condition.
Testing method: 3-point bend test
Support span: 30 mm
Sample size: 5 mm×10 mm×40 mm
Head speed: 0.5 mm/min Oxygen Content The oxygen content [mass %] in the powder was measured by an inert gas fusion-infrared absorption method with an oxygen-nitrogen analyzer "LECO ON736" produced by LECO Japan Corporation. The oxygen content [at] in the powder was calculated from the oxygen and nitrogen contents measured [mass %] using Formulae (1) and (2).

X-Ray Powder Diffraction

The crystal phase was determined by XRD under the following conditions with a common X-ray powder diffraction system "UltimaIII" produced by Rigaku Corporation.
Radiation source: CuKα ray (λ=0.15418 nm)
Measurement mode: 2θ/θ scan
Measurement intervals: 0.01° Divergence slits: 0.5 deg
Receiving slits: 0.3 mm
Measurement time: 1.0 sec
Measurement range: 2θ=20° to 80°
Identification of crystal phase was performed by comparing the XRD pattern observed, with JCPDS No. 00-050-0792.

Average Particle Size

For determining the average particle size of the raw-material powder, an SEM observation image was obtained under the following conditions with an SEM "VE-9800" produced by KEYENCE Corporation.
Acceleration voltage: 10 kV
Magnification: 50 to 5,000 times The SEM observation image was subjected to image analysis using image analysis software "Image-Pro10", and 1,200±400 primary particles the entire outlines of which could be observed in the SEM observation image were selected. The area of each of the primary particles was measured, and the equivalent circle diameter of the primary particle was calculated from the area. The average of the equivalent circle diameters was considered as an average particle size.

Untamped Bulk Density

The untamped bulk density of the powder was measured by the following method. Specifically, a funnel having an orifice diameter of 2.5 mm and a funnel angle of 60° was used. The powder was charged into a cylindrical container having an inside diameter of 28 mm and a volumetric capacity of 25 cm$^3$, and charging of the powder was stopped when the cylindrical container was filled with the powder. Subsequent to the charging, the powder charged in the cylindrical container was leveled off with a spatula at the surface of the cylindrical container without application of compression or vibration. The ratio of the mass [g] of the powder to the volume [25 cm$^3$] of the cylindrical container was calculated as an untamped bulk density. Note that the mass of the powder was calculated by subtracting the mass of the cylindrical container from the total mass of the cylindrical container and the leveled powder.

Actual Density

The actual density of the green body was calculated as the ratio of the mass [g] of the green body measured with an electronic balance to the volume [volume %] of the green body obtained by measuring the dimensions of the green body with vernier calipers. In the measurement of dimensions, the length, width and thickness of the rectangular cuboidal green body were measured.

Example 1

30 g of metal gallium (purity: 6N) was charged into an alumina container. After the alumina container including metal gallium had been placed in a tube furnace, purging with vacuum was performed and a nitridation treatment was performed under the following conditions while an ammonia gas was caused to flow in the furnace. Hereby, a raw-material powder was prepared.
Heating rate: 10° C./min
Treatment temperature: 1,050° C.
Treatment time: 2 hours After holding, air cooling was performed in the tube furnace to reduce the temperature to room temperature. Then, the alumina container was collected and a raw-material powder was obtained.

30 g of the raw-material powder was charged into an alumina container. After the alumina container including the raw-material powder had been placed in a tube furnace, purging with vacuum was performed and the raw-material powder was subsequently sintered under the following conditions while a nitrogen gas was caused to flow in the furnace.
Heating rate: 10° C./min
Sintering temperature: 1,000° C.
Sintering time: 3 hours After sintering, air cooling was performed in the tube furnace. Hereby, a powder of gallium nitride of Example 1 was prepared.

The powder of gallium nitride prepared in Example 1 had an oxygen content of 0.21 at %, an untamped bulk density of 1.35 g/mL and an electrical resistivity of $8.45 \times 10^{-2}$ Ω·cm.

Example 2

A powder of gallium nitride of Example 2 was prepared as in Example 1, except that the raw-material powder was sintered under the following conditions.
Heating rate: 10° C./min
Sintering temperature: 1,050° C.
Sintering time: 1 hour The powder of gallium nitride prepared in Example 2 had an oxygen content of 0.20 at %, an untamped bulk density of 1.35 g/mL and an electrical resistivity of $2.21 \times 10^{-4}$ Ω·cm.

Example 3

A powder of gallium nitride of Example 3 was prepared as in Example 1, except that the raw-material powder was sintered under the following conditions.
Heating rate: 10° C./min
Sintering temperature: 1,000° C.
Sintering time: 0.5 hours The powder of gallium nitride prepared in Example 3 had an oxygen content of 0.20 at %, an untamped bulk density of 1.42 g/mL and an electrical resistivity of $7.60 \times 10^{-1}$ Ω·cm.

Example 4

300 g of metal gallium (purity: 6N) was charged into an alumina container. After the alumina container including metal gallium had been placed in a tube furnace, the inside of the tube furnace was purged with vacuum and a nitridation treatment was subsequently performed under the following conditions while an ammonia gas was caused to flow in the furnace. Hereby, a raw-material powder was prepared.
Heating rate: 10° C./min
Treatment temperature: 1,140° C.
Treatment time: 2 hours Subsequent to the nitridation treatment, the temperature was reduced to 1,000° C. at a cooling rate of 10° C./min. Then, a switchover from an ammonia gas to a nitrogen gas was made, and sintering was performed at 1,000° C. for 30 minutes while a nitrogen gas was caused to flow in the furnace. Subsequenlty, the temperature was reduced to room temperature by air cooling. Hereby, a powder of gallium nitride of Example 4 was prepared.

The powder of gallium nitride prepared in Example 4 had an oxygen content of 0.04 at %, an untamped bulk density of 1.71 g/mL and an electrical resistivity of $4.24 \times 10^{-2}$ Ω·cm.

Example 5

30 g of metal gallium (purity: 6N) was charged into an alumina container. After the alumina container including metal gallium had been placed in a tube furnace, the inside of the tube furnace was purged with vacuum and a nitridation treatment was subsequently performed under the following conditions while an ammonia gas was caused to flow in the furnace. Hereby, a raw-material powder was prepared.
Heating rate: 10° C./min
Treatment temperature: 1,125° C.
Holding time: 2 hours Subsequent to the nitridation treatment, air cooling was performed in the tube furnace to reduce the temperature to room temperature. Hereby, a raw-material powder was obtained.

30 g of the raw-material powder was charged into an alumina container. After the alumina container including metal gallium had been placed in a tube furnace, the inside of the tube furnace was purged with vacuum and sintering was performed under the following conditions while a nitrogen gas was caused to flow in the furnace.
Heating rate: 10° C./min
Sintering temperature: 1,000° C.
Sintering time: 3 hours After sintering, the temperature was reduced to room temperature by air cooling. Hereby, a powder of gallium nitride of Example 5 was prepared.

The powder of gallium nitride prepared in Example 5 had an oxygen content of 0.07 at %, an untamped bulk density of 1.81 g/mL and an electrical resistivity of $3.82 \times 10^{-2}$ Ω·cm.

Comparative Example 1

In Comparative Example 1, a powder that had been subjected to a heat treatment was used as a powder of gallium nitride. Specifically, 30 g of metal gallium (purity: 6N) was charged into an alumina container. After the alumina container including metal gallium had been placed in a tube furnace, the inside of the tube furnace was purged with vacuum and a nitridation treatment was subsequently performed under the following conditions while an ammonia gas was caused to flow in the furnace. Hereby, a powder of gallium nitride of Comparative Example 1 was prepared.

Heating rate: 10° C./min
Treatment temperature: 1,125° C.
Holding time: 2 hours

The powder of gallium nitride prepared in Comparative Example 1 had an oxygen content of 0.19 at %, an untamped bulk density of 1.89 g/mL and an electrical resistivity of more than $1 \times 10^7 \Omega \cdot cm$.

Comparative Example 2

In Comparative Example 2, a commercial gallium nitride powder "4N" (Lot. 302577) produced by Kojundo Chemical Laboratory Co., Ltd. was used as a powder of gallium nitride.

The powder of gallium nitride prepared in Comparative Example 2 had an oxygen content of 15.50 at %, an untamped bulk density of 0.28 g/mL and an electrical resistivity of more than $8.91 \times 10^6 \Omega \cdot cm$.

Measurement Example 8 g of each of the powders of gallium nitride prepared in Examples 4 and 5 and Comparative Examples 1 and 2 was weighed, charged into a rectangular cuboidal die having a size of 10 mm×40 mm and uniaxially pressed at a pressure of 100 MPa to form a green body. The actual density and deflective strength of each of the green bodies were measured. Table 1 lists the results.

TABLE 1

|  | Deflective strength [MPa] | Actual density [g/cm³] |
|---|---|---|
| Example 1 | 2.60 | 4.23 |
| Example 2 | 3.68 | 4.48 |
| Example 3 | 2.19 | 3.97 |
| Example 4 | 2.43 | 4.02 |
| Example 5 | 2.61 | 4.26 |
| Comparative Example 1 |  |  |
| Comparative Example 2 | 2.05 | 2.08 |

It was confirmed that green bodies having a high actual density (4.0 g/cm³ or more) could be formed using the powders prepared in Examples. It was also confirmed that the above green bodies had a high deflective strength (2.1 MPa or more). Note that the powder of gallium nitride prepared in Comparative Example 1 substantially could not be formed into shape because the green body collapsed when it was removed from the die, although the powder prepared in Comparative Example 1 had a higher untamped bulk density and a higher filling property than any of the powders prepared in Examples. Thus, actual density and deflective strength could not be measured in Comparative Example 1. This confirms that a green body formed of a powder having a high oxygen content has a considerably low strength. It is confirmed that, although the powder of gallium nitride prepared in Comparative Example 2, which had a high electrical resistivity, could be formed into a green body, both actual density and deflective strength of the green body were low.

The present application is based on Japanese Patent Application No. 2023-095501 filed on Jun. 9, 2023, the contents of which are incorporated herein by reference in its entirety. All the references cited herein are incorporated herein by reference in their entirety.

What is claimed is:

1. A powder of gallium nitride, the powder having an oxygen content of 0.5 at % or less,
   wherein a green body formed by charging 8 g of the powder into a rectangular cuboidal die having a size of 10 mm×40 mm and uniaxially pressing the powder at a pressure of 100 MPa has an electrical resistivity of $1.0 \times 10^7 \Omega \cdot cm$ or less.

2. The powder according to claim 1,
   wherein the gallium nitride has a nitrogen vacancy.

3. The powder according to claim 1, having an untamped bulk density of 1.00 g/mL or more and 1.85 g/mL or less.

4. The powder according to claim 1, having an average particle size of 1 μm or more and 150 μm or less.

5. The powder according to claim 1,
   wherein a ratio of an area-10% size of the powder to an area-90% size of the powder is 0.01 or more and 0.45 or less.

6. A method for producing the powder according to claim 1, the method comprising:
   a heat treatment step that is a step of heating a powder of gallium nitride at 900° C. or more and 1,300° C. or less in an atmosphere in which an inert gas flows.

7. The method according to claim 6,
   wherein the powder of gallium nitride is a powder of gallium nitride prepared by nitriding metal gallium.

8. The method according to claim 6,
   wherein the inert gas-flow atmosphere is an atmosphere in which a gas including at least one of argon and nitrogen flows.

9. The method according to claim 6,
   wherein a rate at which the inert gas flows is 500 mL/min or more and 5,000 mL/min or less.

10. A method for producing a sintered body of gallium nitride, the method comprising:
    forming the powder according to claim 1 into a green body; and
    sintering the green body.

* * * * *